US012615193B2

(12) United States Patent
Wu

(10) Patent No.: US 12,615,193 B2
(45) Date of Patent: Apr. 28, 2026

(54) DEVICE CONTROL METHOD AND APPARATUS, SERVER, AND STORAGE MEDIUM

(71) Applicant: Huawei Cloud Computing Technologies Co., Ltd., Guizhou (CN)

(72) Inventor: Wenqing Wu, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/436,909

(22) Filed: Feb. 8, 2024

(65) Prior Publication Data

US 2024/0187315 A1    Jun. 6, 2024

Related U.S. Application Data

(63) Continuation of application No. PCT/CN2022/112884, filed on Aug. 16, 2022.

(30) Foreign Application Priority Data

Aug. 19, 2021    (CN) .......................... 202110956934.2

(51) Int. Cl.
 *H04L 41/40* (2022.01)
 *H04L 41/14* (2022.01)
(52) U.S. Cl.
 CPC ............ *H04L 41/40* (2022.05); *H04L 41/145* (2013.01)
(58) Field of Classification Search
 CPC ....... H04L 67/565; H04L 41/40; H04L 41/14; G06F 40/211; G06F 40/242; G06F 40/30
 See application file for complete search history.

(56) References Cited

U.S. PATENT DOCUMENTS

| | | | |
|---|---|---|---|
| 10,643,151 B1* | 5/2020 | Jahn ......................... | G06F 40/58 |
| 12,056,487 B2* | 8/2024 | Makkar ..................... | G06F 8/71 |
| 2013/0054765 A1* | 2/2013 | Baret ................. | G05B 19/0423 |
| | | | 709/220 |
| 2015/0180880 A1* | 6/2015 | Nakano ............... | H04L 12/2807 |
| | | | 726/4 |
| 2016/0315816 A1* | 10/2016 | Fang ....................... | H04W 4/70 |

(Continued)

FOREIGN PATENT DOCUMENTS

| | | |
|---|---|---|
| CN | 111308975 A | 6/2020 |
| WO | 2020264095 A1 | 12/2020 |
| WO | 2021108680 A1 | 6/2021 |

*Primary Examiner* — Tonia L Dollinger
*Assistant Examiner* — Linh T. Nguyen
(74) *Attorney, Agent, or Firm* — Conley Rose, P.C.

(57) ABSTRACT

A device control method includes performing format conversion on a control entity of a control command sent by a control device, based on a correspondence that is recorded in a digital twin model of a network device with any model number of the type and that is between a standard data format of the network device of the type and a data format supported by the network device with the model number. According to the method, the control device can control the network devices with different model numbers using a control entity of a control command in a unified standard data format, and enable the network device to identify the control entity of the control command sent by the control device without adapting data formats supported by the network devices with different model numbers.

18 Claims, 8 Drawing Sheets

(56)         References Cited

U.S. PATENT DOCUMENTS

2017/0116103  A1*   4/2017   Cencini ................... H04L 41/24
2022/0188087  A1*   6/2022   Montag .................... G06F 8/60
2024/0036537  A1*   2/2024   Gupta ................. H04L 12/2834
2024/0184275  A1*   6/2024   Essigmann ........ G05B 19/4185
2025/0131131  A1*   4/2025   Gurin ................... H04L 67/565

* cited by examiner

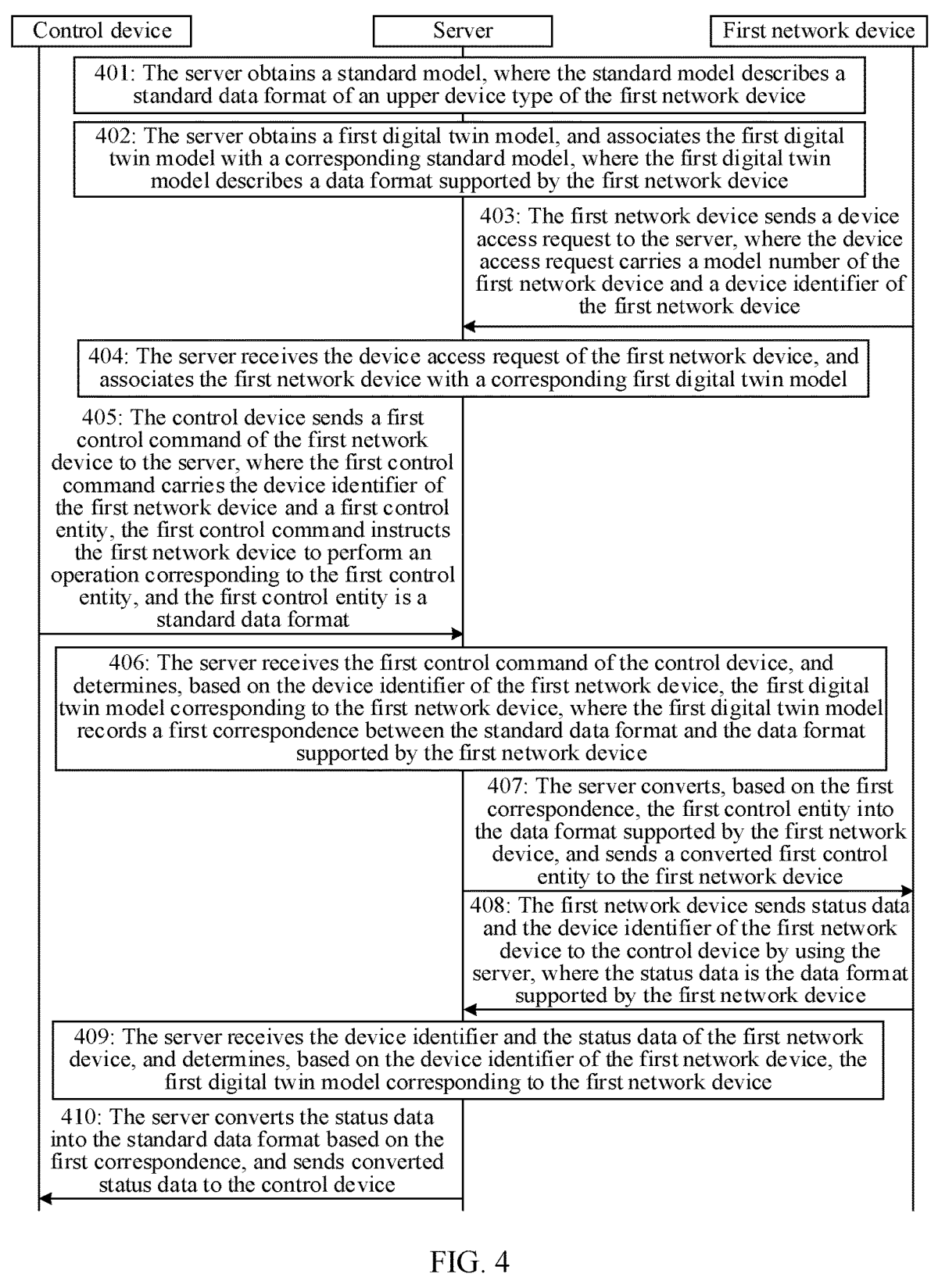

| Control device | Server | First network device |
|---|---|---|

401: The server obtains a standard model, where the standard model describes a standard data format of an upper device type of the first network device 402: The server obtains a first digital twin model, and associates the first digital twin model with a corresponding standard model, where the first digital twin model describes a data format supported by the first network device 403: The first network device sends a device access request to the server, where the device access request carries a model number of the first network device and a device identifier of the first network device 404: The server receives the device access request of the first network device, and associates the first network device with a corresponding first digital twin model 405: The control device sends a first control command of the first network device to the server, where the first control command carries the device identifier of the first network device and a first control entity, the first control command instructs the first network device to perform an operation corresponding to the first control entity, and the first control entity is a standard data format 406: The server receives the first control command of the control device, and determines, based on the device identifier of the first network device, the first digital twin model corresponding to the first network device, where the first digital twin model records a first correspondence between the standard data format and the data format supported by the first network device 407: The server converts, based on the first correspondence, the first control entity into the data format supported by the first network device, and sends a converted first control entity to the first network device 408: The first network device sends status data and the device identifier of the first network device to the control device by using the server, where the status data is the data format supported by the first network device 409: The server receives the device identifier and the status data of the first network device, and determines, based on the device identifier of the first network device, the first digital twin model corresponding to the first network device 410: The server converts the status data into the standard data format based on the first correspondence, and sends converted status data to the control device

FIG. 4

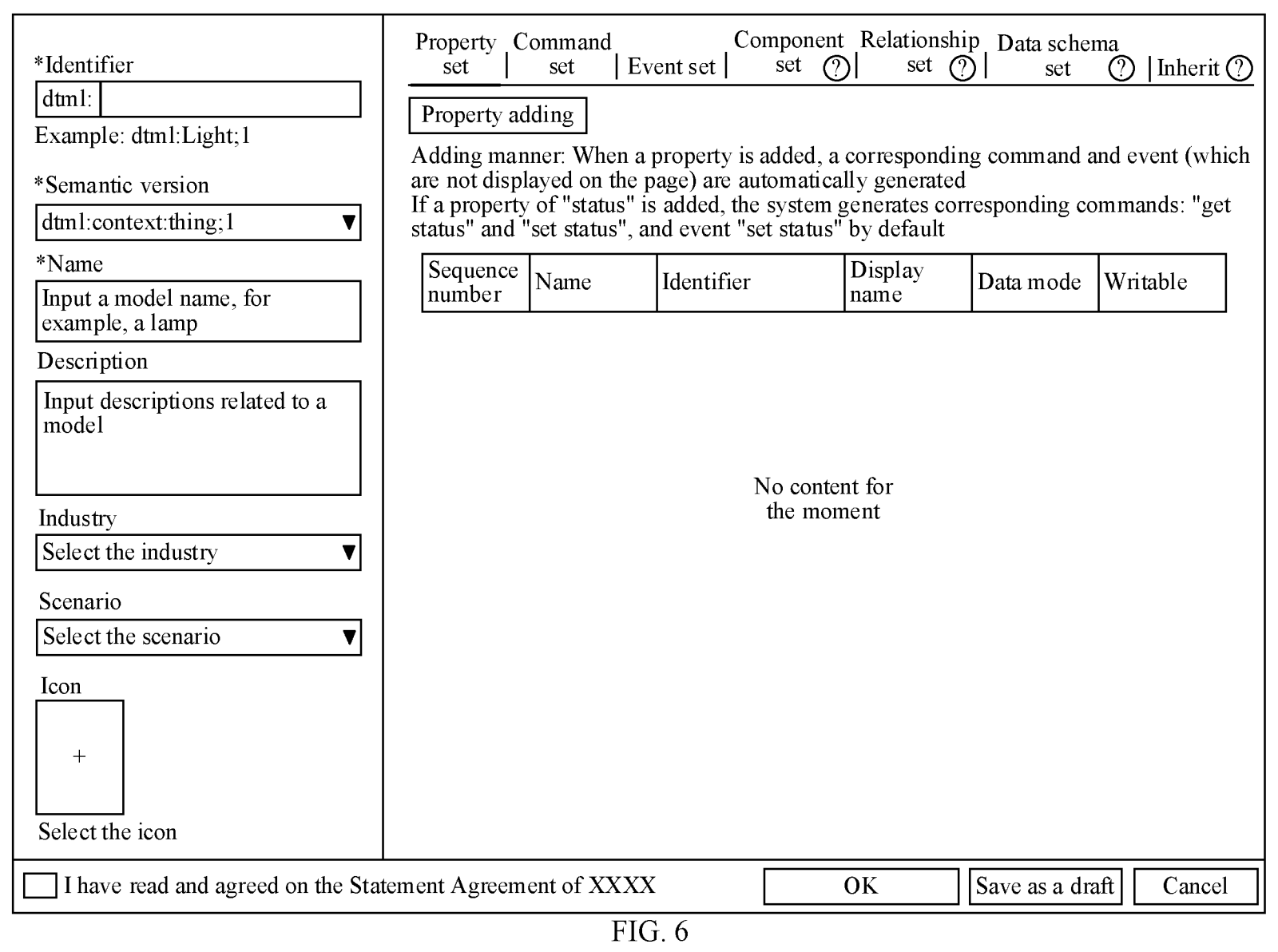

Property | Command | Event set | Component | Relationship | Data schema
set | set | | set ⑦ | set ⑦ | set ⑦ | Inherit ⑦

Property adding

Adding manner: When a property is added, a corresponding command and event (which are not displayed on the page) are automatically generated If a property of "status" is added, the system generates corresponding commands: "get status" and "set status", and event "set status" by default

| Sequence number | Name | Identifier | Display name | Data mode | Writable |
|---|---|---|---|---|---|

No content for the moment

*Identifier dtml:

Example: dtml:Light;1

*Semantic version dtml:context:thing;1 ▶

*Name

Input a model name, for example, a lamp

Description

Input descriptions related to a model

Industry

Select the industry ▶

Scenario

Select the scenario ▶

Icon

+

Select the icon

☐ I have read and agreed on the Statement Agreement of XXXX

OK     Save as a draft     Cancel

FIG. 6

DEVICE CONTROL METHOD AND APPARATUS, SERVER, AND STORAGE MEDIUM

CROSS-REFERENCE TO RELATED APPLICATIONS

This is a continuation of International Patent Application No. PCT/CN2022/112884 filed on Aug. 16, 2022, which claims priority to Chinese Patent Application No. 202110956934.2 filed on Aug. 19, 2021. The disclosures of the aforementioned applications are hereby incorporated by reference in their entireties.

TECHNICAL FIELD

This application relates to the field of Internet of things (IOT) technologies, and in particular, to a device control method and apparatus, a server, and a storage medium.

BACKGROUND

With the rapid development of IoT technologies, an IoT device may access an IoT platform to implement communication between people, machines, and things anytime, anywhere. In addition, an IoT application can control a corresponding IoT device through the IoT platform. In conventional technologies, developers of the IoT application develop, through the IoT platform, a digital twin model corresponding to a device. After the IoT device accesses the platform, the IoT device is bound to the corresponding digital twin model. In this way, the IoT application and the IoT device can perform control command delivery and data reporting by using the digital twin model, so that the IoT device is controlled.

In the foregoing technologies, because different data formats are set for devices of a same type produced by different manufactures, the application developers need to control the devices of different manufactures according to commands in different data formats using different digital twin models. As there is a strong coupling between the application and the device, making a process of controlling the IoT device very complex.

SUMMARY

To resolve a problem that a process of controlling a network device is complex, embodiments of this disclosure provide a device control method and apparatus, a server, and a computer-readable storage medium. The technical solution is as follows.

A first aspect provides a device control method, performed by a server, and the method includes receiving a first control command of a control device, where the first control command carries a device identifier of a first network device and a first control entity, the first control command instructs the first network device to perform an operation corresponding to the first control entity, the first control entity complies with a standard data format, and the standard data format is described by a standard model corresponding to an upper device type of the first network device, determining, based on the device identifier of the first network device, a first digital twin model corresponding to the first network device, where the first digital twin model describes a data format supported by the first network device, and the first digital twin model records a first correspondence between the standard data format and the data format supported by the first network device, and converting, based on the first correspondence, the first control entity into the data format supported by the first network device, and sending a converted first control entity to the first network device.

According to the device control method provided in this embodiment of this disclosure, for network devices of any type, the network devices of the type include a plurality of different model numbers. Format conversion is performed, based on a correspondence that is recorded in a digital twin model of a network device with any model number of the type and that is between a standard data format of the network device of the type and a data format supported by the network device with the model number, on a control entity of a control command sent by a control device. According to the method, the control device can control the network devices with different model numbers by using a control entity of a control command in a unified standard data format, and the network device can identify the control entity of the control command sent by the control device without adapting the standard data format to data formats supported by the network devices with different model numbers. Decoupling between the network device and an IoT application is implemented, thereby simplifying a process of controlling the network device.

In some embodiments, the method further includes receiving a second control command of the control device, where the second control command carries a device identifier of a second network device and a second control entity, the second control command instructs the second network device to perform an operation corresponding to the second control entity, the second control entity complies with the standard data format, a model number of the first network device is different from a model number of the second network device, and the upper device type of the first network device is the same as an upper device type of the second network device, determining, based on the device identifier of the second network device, a second digital twin model corresponding to the second network device, where the second digital twin model describes a data format supported by the second network device, and the second digital twin model records a second correspondence between the standard data format and the data format supported by the second network device, and converting, based on the second correspondence, the second control entity into the data format supported by the second network device, and sending a converted second control entity to the second network device.

According to the method provided in this embodiment of this disclosure, format conversion can be performed on the control entity of the second control command by using a correspondence between a standard data format of an upper device type and the data format supported by the second network device, and a converted control entity can be sent to the second network device, to control network devices with different model numbers of a same type by using a control entity of a control command in a unified standard data format.

In some embodiments, the method further includes receiving status data of the first network device and the device identifier of the first network device, where the status data is the data format supported by the first network device, and converting the status data into the standard data format based on the first correspondence, and sending converted status data to the control device. Format conversion is performed on the status data of the network device, so that the control device can identify status data of network devices with different model numbers in a unified standard data format.

In some embodiments, before receiving a first control command of a control device, the method further includes receiving a device access request of the first network device, where the device access request carries a model number of the first network device and the device identifier of the first network device, determining, based on the model number of the first network device, a first digital twin model corresponding to the model number of the first network device, and establishing a third correspondence between the device identifier of the first network device and the first digital twin model. The third correspondence between the device identifier and the first digital twin model is established, so that the first network device is bound to the corresponding first digital twin model. Therefore, a format of the control entity of the first control command of the first network device can be converted.

In some embodiments, after establishing a third correspondence between the device identifier of the first network device and the first digital twin model, the method further includes creating a first running instance of the first network device based on the first digital twin model. The first running instance is created, so that the status data of the first network device can be stored. Therefore, a historical status of the first network device can be found.

In some embodiments, the first correspondence includes a correspondence between a digital twin metamodel of the first digital twin model and a standard metamodel of the standard model.

Converting, based on the first correspondence, the first control entity into the data format supported by the first network device includes determining one or more standard metamodels of the upper device type based on the correspondence between a digital twin metamodel of the first digital twin model and a standard metamodel of the standard model, and converting, based on the first digital twin model and the one or more standard metamodels of the upper device type, the first control entity into the data format supported by the first network device. A standard metamodel corresponding to the first network device is determined, so that format conversion can be performed on the first control entity by using a standard data format provided by the standard metamodel and the format supported by the first network device, to control the first network device.

In some embodiments, the first digital twin model includes one or more digital twin metamodels. The digital twin metamodel includes one or more of the following: a property metamodel, a command metamodel, an event metamodel, a data metamodel, a component metamodel, and a relationship metamodel. The first digital twin model is divided into a plurality of digital twin metamodels, so that the digital twin model can be divided into a plurality of submodels. Therefore, a plurality of features of a type of the first network device can be more flexibly described, so that the first network device can be associated with a corresponding standard model more easily.

A second aspect provides a device control apparatus. The apparatus includes a plurality of functional modules configured to perform corresponding steps in the device control method provided in the first aspect.

According to the device control apparatus, a network device with any model number of any type performs, based on a correspondence that is recorded in a digital twin model of the network device with the model number and that is between a standard data format of the network device of the type and a data format supported by the network device with the model number, format conversion on a control entity of a control command sent by a control device, so that the control device can control network devices with different model numbers by using a control entity of a control command in a unified standard data format. In addition, the network device can identify the control entity of the control command sent by the control device without adapting the standard data format to data formats supported by the network devices with different model numbers. Decoupling between the network device and an IoT application is implemented, thereby simplifying a process of controlling the network device.

A third aspect provides a server. The server includes a communication bus, at least one network interface, a memory, and at least one processor. The communication bus is used to perform information transmission between the foregoing components. The at least one network interface is configured to communicate with another device or a communication network. The memory stores program code. The at least one processor implements any step of the device control method in the first aspect by reading and executing the program code stored in the memory.

According to the server, a network device with any model number of any type performs, based on a correspondence that is recorded in a digital twin model of the network device with the model number and that is between a standard data format of the network device of the type and a data format supported by the network device with the model number, format conversion on a control entity of a control command sent by a control device, so that the control device can control network devices with different model numbers by using a control entity of a control command in a unified standard data format. In addition, the network device can identify the control entity of the control command sent by the control device without adapting the standard data format to data formats supported by the network devices with different model numbers. Decoupling between the network device and an IoT application is implemented, thereby simplifying a process of controlling the network device.

A fourth aspect provides a computer-readable storage medium. When program code in the computer-readable storage medium is executed by a processor of a server, the server is enabled to perform any step of the device control method in the first aspect.

According to the computer-readable storage medium, a network device with any model number of any type performs, based on a correspondence that is recorded in a digital twin model of the network device with the model number and that is between a standard data format of the network device of the type and a data format supported by the network device with the model number, format conversion on a control entity of a control command sent by a control device, so that the control device can control network devices with different model numbers by using a control entity of a control command in a unified standard data format. In addition, the network device can identify the control entity of the control command sent by the control device without adapting the standard data format to data formats supported by the network devices with different model numbers. Decoupling between the network device and an IoT application is implemented, thereby simplifying a process of controlling the network device.

BRIEF DESCRIPTION OF DRAWINGS

FIG. 4 is a flowchart of steps of a device control method according to an embodiment of this disclosure;

FIG. 6 shows a standard model creation page according to an embodiment of this disclosure;

DESCRIPTION OF EMBODIMENTS

To make objectives, technical solutions, and advantages of this disclosure clearer, the following further describes implementations of this disclosure in detail with reference to the accompanying drawings.

To facilitate understanding of technical processes of embodiments of this disclosure, the following explains some key terms and nouns in embodiments of this disclosure.

(1) IoT: The IoT is an Internet that connects things, and can implement interconnection between things and between people and things. The IoT is a network that implements intelligent identification, positioning, tracking, monitoring, and management.

(2) IoT platform: The IoT platform is an Internet-based platform that connects objects and implements an IoT function. The IoT platform has a plurality of functions such as communication between a network device and an IoT application, device access, device management, data storage, and access of the IoT application.

(3) Digital twin model: The digital twin model is a virtual model implemented based on a digital twin model language (DTML), and is used to describe a feature of the network device.

(4) DTML: The DTML is a computer program language based on a JAVASCRIPT object notation for linked data (JSON-LD), and is used to describe the digital twin model.

The following describes an implementation environment of a device control method provided in embodiments of this disclosure.

Figure 1:
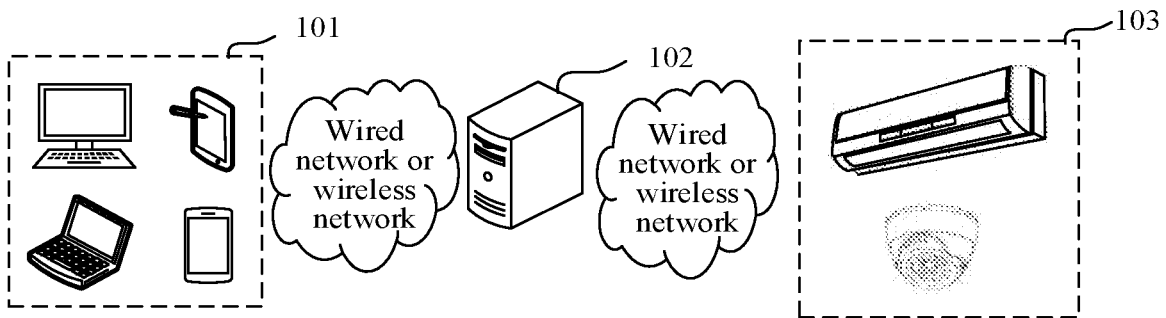
FIG. 1 is a schematic diagram of an implementation environment of a device control method according to an embodiment of this disclosure.

FIG. 1 is a schematic diagram of an implementation environment of a device control method according to an embodiment of this disclosure. The implementation environment includes control devices 101, a server 102, and network devices 103. The control device 101 and the server 102 can be directly or indirectly connected via a wired network or a wireless network. The server 102 and the network device 103 can be directly or indirectly connected via a wired network or a wireless network. This is not limited in embodiments of this disclosure.

The control device 101 may be a smartphone, a tablet computer, a notebook computer, a desktop computer, or the like, but is not limited thereto. An IoT application is installed in the control device 101, and the IoT application may be an industrial application, a logistics application, a life application, or the like. The control device 101 can send a control command to the network device 103 based on the IoT application by using the server 102, control the network device to perform a corresponding operation, and receive, by using the server 102, status data sent by the network device 103.

The server 102 is a control server. The server 102 may be an independent physical server, or may be a server cluster or a distributed system including a plurality of physical servers, or may be a cloud server that provides basic cloud computing services such as a cloud service, a cloud database service, a cloud computing service, a cloud function service, cloud storage, a network service, cloud communication, a middleware service, a domain name service, a security service, a content delivery network (CDN), a big data service, and an artificial intelligence platform. An IoT platform is deployed on the server 102. The server 102 can forward the control command and the status data between the control device 101 and the network device 103 through the IoT platform.

The network devices 103 may be network devices of different types produced by different manufacturers, for example, a camera, an intelligent refrigerator, and an air conditioner. This is not limited in the embodiments. The network device 103 can receive the control command of the control device 101 by using the server 102, perform the corresponding operation based on the control command, and send the status data to the control device 101 by using the server 102.

The following describes a structure of the server in embodiments of this disclosure.

Figure 2:
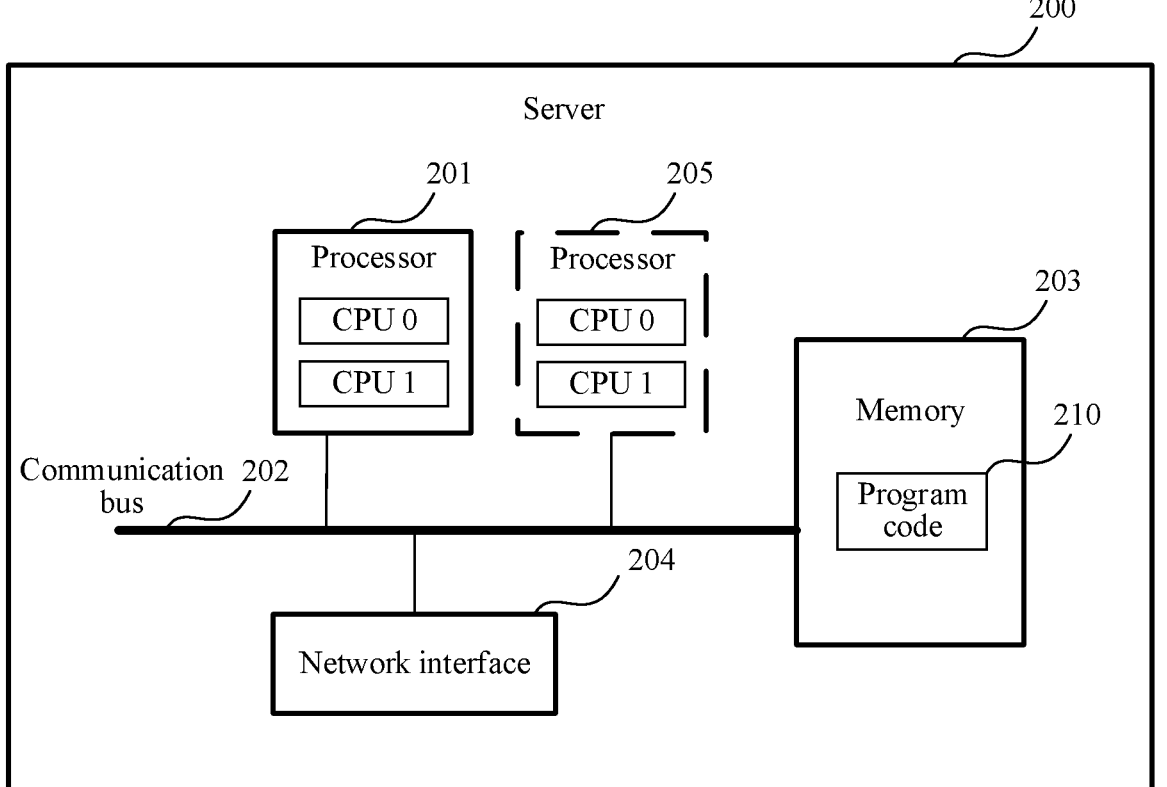
FIG. 2 is a schematic diagram of a structure of a server according to an embodiment of this disclosure.

FIG. 2 is a schematic diagram of a structure of a server 200 according to an embodiment of this disclosure. The server 200 shown in FIG. 2 is configured to perform an operation related to a device control method. As shown in FIG. 2, the server 200 includes at least one processor 201, a communication bus 202, a memory 203, and at least one network interface 204.

The processor 201 is, for example, a general-purpose central processing unit (CPU), a network processor (NP), a graphics processing unit (GPU), a neural-network processing unit (NPU), a data processing unit (DPU), a microprocessor, or one or more integrated circuits configured to implement solutions of this disclosure. For example, the processor 201 includes an application-specific integrated circuit (ASIC), a programmable logic device (PLD), or a combination thereof. The PLD is, for example, a complex PLD (CPLD), a field-programmable gate array (FPGA), a generic array logic (GAL), or any combination thereof.

The communication bus 202 is used to perform information transmission between the foregoing components. The communication bus 202 may be optionally classified into an address bus, a data bus, a control bus, and the like. For ease of representation, only one thick line is used for representing the bus in FIG. 2, but this does not mean that there is only one bus or only one type of bus.

The memory 203 is, for example, a read-only memory (ROM) or another type of static storage device that can store static information and instructions, a random-access memory (RAM) or another type of dynamic storage device that can store information and instructions, an electrically erasable programmable ROM (EEPROM), a compact disc (CD) ROM (CD-ROM) or another optical disk storage, an optical disk storage (including a compressed optical disc, a laser disc, an optical disc, a DIGITAL VERSATILE DISC (DVD), a BLU-RAY disc, or the like), a magnetic disk storage medium or another magnetic storage device, or any other medium that can be configured to carry or store desired program code in the form of instructions or a data structure and that can be accessed by a computer, but is not limited thereto. For example, the memory 203 exists independently, and is connected to the processor 201 through the communication bus 202. Alternatively, the memory 203 and the processor 201 are optionally integrated together.

The network interface 204 uses any apparatus, for example, a transceiver, to communicate with another device or a communication network. The network interface 204 includes a wired network interface, and optionally further includes a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

In some embodiments, the processor 201 includes one or more CPUs such as a CPU 0 and a CPU 1 shown in FIG. 2.

In some embodiments, the server 200 optionally includes a plurality of processors such as a processor 201 and a processor 205 shown in FIG. 2. Each of the processors is, for example, a single-core processor, or a multi-core processor. Optionally, the processor herein refers to one or more devices, circuits, and/or processing cores configured to process data (for example, computer program instructions).

In some embodiments, the server 200 further includes an output device and an input device. The output device optionally displays information in a plurality of manners. For example, the output device may optionally be a liquid-crystal display (LCD), a light-emitting diode (LED) display device, a cathode-ray tube (CRT) display device, or a projector. The input device communicates with the processor 201, and optionally receives input of a user in a plurality of manners. For example, the input device may optionally be a mouse, a keyboard, a touchscreen device, or a sensing device.

Optionally, the processor 201 implements the method in the following embodiments by reading program code 210 stored in the memory 203, or the processor 201 implements the method in the following embodiments by using program code stored internally. When the processor 201 implements the method in the following embodiments by reading the program code 210 stored in the memory 203, the memory 203 stores program code for implementing the device control method provided in embodiments of this disclosure.

For more details of implementing the foregoing functions by the processor 201, refer to descriptions in the following method embodiments. Details are not described herein.

An embodiment of this disclosure further provides a computer-readable storage medium including program code, for example, a memory 203 including the program code. The program code may be executed by a processor 201 of a server 200 to complete a device control method. Optionally, the computer-readable storage medium may be a ROM, a RAM, a CD-ROM, a magnetic tape, a floppy disk, an optical data storage device, or the like.

Based on the foregoing implementation environment, the following describes the IoT platform deployed on the server.

Figure 3:
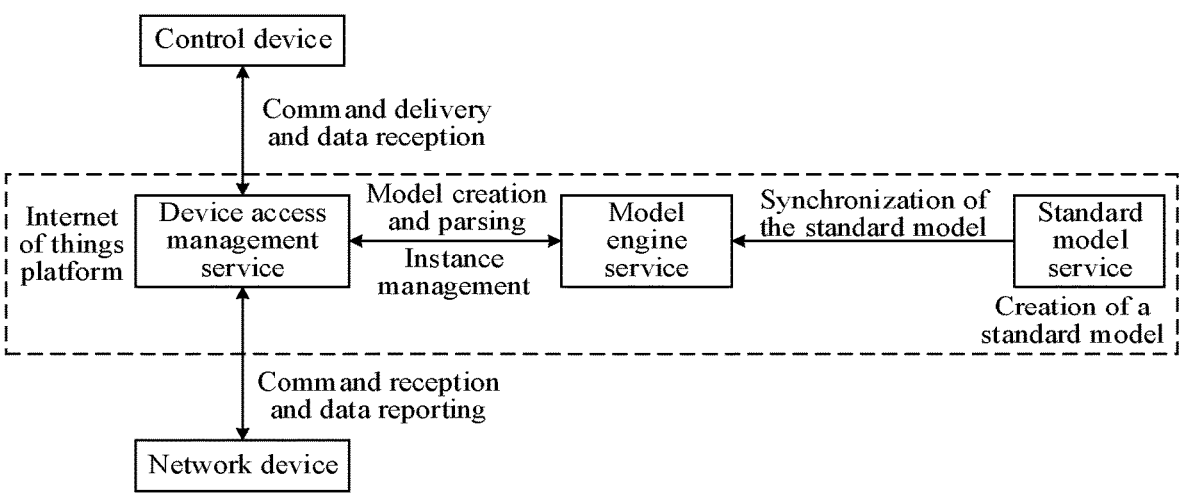
FIG. 3 is a schematic diagram of a structure of an IoT platform according to an embodiment of this disclosure.

FIG. 3 is a schematic diagram of a structure of an IoT platform according to an embodiment of this disclosure. It should be understood that FIG. 3 merely shows an example of a schematic structural diagram of the IoT platform. Division of functions of the IoT platform is not limited in this disclosure. As shown in FIG. 3, the IoT platform provides three types of services, including a device access management service, a model engine service, and a standard model service. The following separately describes the three types of services.

The device access management service is used to associate an IoT application, a network device, and a corresponding digital twin model, and provide functions of device access and application access, to implement interworking between the IoT application and the network device. The device access management service is further used to send a received control command and received status data to the model engine service, receive status data and a control entity of the control command and whose formats are converted and that are sent by the model engine service, and forward the control entity and the status data to a corresponding network device or IoT application.

The model engine service is a functional unit implemented by using a DTML, and the functional unit is configured to synchronize a standard model in the standard model service, and generate a standard application programming interface (API) based on the standard model. The model engine service is further used to store and parse a digital twin model, perform data format conversion on the control entity of the control command and the status data that are sent by the device access management service, and send the converted control entity of the control command and the converted status data to the device access management service. For a detailed process, refer to an embodiment corresponding to FIG. 4.

The standard model service is a functional unit implemented by using the DTML, and the functional unit is configured to create and store a standard model.

Based on descriptions of a system architecture to which embodiments of this disclosure are applied and a structure of the IoT platform, the following describes a device control method provided in embodiments of this disclosure with reference to FIG. 4. FIG. 4 is a flowchart of steps of a device control method according to an embodiment of this disclosure. The method is performed by a server. As shown in FIG. 4, the device control method includes the following steps 401 to 410.

Step 401: The server obtains a standard model, where the standard model describes a standard data format of an upper device type of a first network device.

The upper device type of the first network device refers to a device type to which the first network device belongs. The first network device may be a network device with any model number of the device type. For example, the upper device type is a camera, and the first network device is a camera with a first model number.

If a standard data format needs to be provided for any upper device type to simplify a process of controlling a network device of the upper device type, a platform administrator creates a standard model of the network device of the upper device type on the server. The standard model may be a standard metamodel group. In other words, the standard model may include one or more standard metamodels, and each standard metamodel is used to describe one feature of the upper device type. The standard metamodel includes one or more of a standard property metamodel (property), a standard command metamodel (command), a standard event metamodel (event), a standard data metamodel (dataschema), a standard component metamodel (component), and a standard relationship metamodel (relationship). The standard model is divided into a plurality of standard metamodels, and the standard model can be divided into a plurality of submodels. Therefore, a plurality of features of the upper device type can be more flexibly described, so that a digital twin model can be associated with the standard model more easily subsequently.

Figure 5:
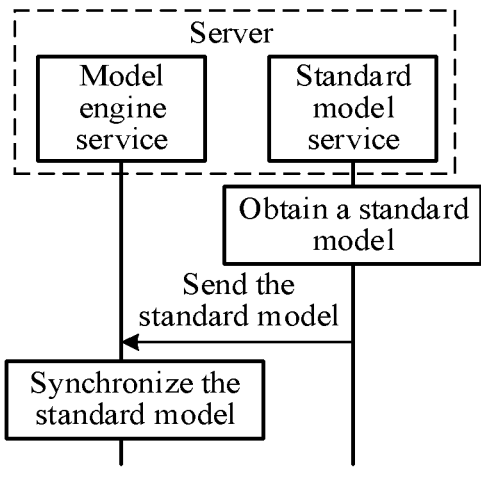
FIG. 5 is a flowchart of steps of obtaining a standard model according to an embodiment of this disclosure.

In some embodiments, a process of obtaining the standard model by the server is shown in FIG. 5. A standard model service of an IoT platform provides a standard model creation page shown in FIG. 6. The platform administrator can compile model code on the standard model creation page, to create the standard model. The server is in response to a submission operation performed on the model code of the standard model on the standard model creation page, and the standard model service stores the model code, that is, stores the standard model. It may be understood that the standard model may include one or more standard metamodels, standard models corresponding to different upper device types may include different standard metamodels, and the platform administrator can create different standard models based on features of the different upper device types. This is not limited in this embodiment of this disclosure.

It should be noted that, when creating a standard model of a network device of any upper device type, the platform administrator may first learn of a function and a property of the network device of the upper device type by querying device documents provided by manufacturers of a plurality of network devices of the upper device type, and then create the standard model, so that the created standard model can accurately and comprehensively describe a feature of the network device of the upper device type.

For example, an example in which the upper device type is a camera is used for description. A camera standard model includes two standard metamodels: a standard command metamodel and a standard property metamodel. The platform administrator can compile model code on the standard model creation page, and in response to a submission operation performed on the model code of the camera standard model, the standard model service stores the camera standard model. The model code of the camera standard model is as follows:

```
"rotateCommand":{   //metamodel identifier of the standard command
metamodel
      "displayName":"camera rotation",
      "input": {   //input parameter
        "@type": "object",
        "displayName":"parameters: horizontal rotation angle,
vertical rotation angle, and speed",
        "fields":{
            "horizontalAngle":  {   //identifier of the horizontal
rotation angle parameter
                  "@type":"integer"
            },
          "verticalAngle": {   //identifier of the vertical rotation angle
          parameter
              "@type":"integer"
          },
          "speed": {   //identifier of the speed parameter
              "@type":"integer"
          }
        }
      },
      "output": {   //output parameter
        "@type": "object",
        "fields": {
          "SUCCESS": {
              "@type": "integer"
          }
        }
      }
    },
```

"status": {omitted}//metamodel identifier of the standard
    property metamodel A standard metamodel identified by rotateCommand is a standard command metamodel, and is configured to provide a standard data format of the rotate command of the camera. The rotate command includes three input parameters: the horizontal rotation angle, the vertical rotation angle, and the speed. Standard data formats of the three parameters are respectively formats described in code segments corresponding to horizontalAngle, verticalAngle, and speed. A standard metamodel identified by status is a standard property metamodel, and is configured to provide a standard data format of status data of the camera.

In some embodiments, the server can generate a standard application programming interface based on the standard model. Step 401 further includes the following. The standard model service sends a stored standard model to a model engine service, and the model engine service receives and stores the standard model to complete synchronization of the standard model, parses the standard model, and generates the standard application programming interface for each standard metamodel of the standard model. The standard application programming interface can be used for development of an IoT application, so that the IoT application can send or receive a control entity of a control command and status data that are in the standard data format.

For example, an example in which a standard application programming interface is generated for the camera standard model is used for description. The model engine service synchronizes the camera standard model from the standard model service, parses the camera standard model, and generates the standard application programming interface including a rotate command interface and a status property interface for two standard metamodels. The standard application programming interface of the two standard metamodels is shown as follows:

```
Https://{host}/device/(deviceid)/rotateCommand   //rotate command
interface
Https://{host}/device/(deviceid)/status   //status property interface
```

Step 402: The server obtains a first digital twin model, and associates the first digital twin model with a corresponding standard model, where the first digital twin model describes a data format supported by the first network device.

For any upper device type, if a network device with any model number of the upper device type (for example, a network device with a first model number of the upper device type) needs to be controlled using the IoT application, an application developer creates, on the IoT platform, a digital twin model corresponding to the network device with the first model number, and develops the IoT application.

The first digital twin model is a first digital twin metamodel group. The first digital twin model includes one or more digital twin metamodels, and each digital twin metamodel is used to describe one feature of the first network device. The digital twin metamodel includes one or more of the following: a property metamodel, a command metamodel, an event metamodel, a data metamodel, a component metamodel, and a relationship metamodel.

Figure 7:
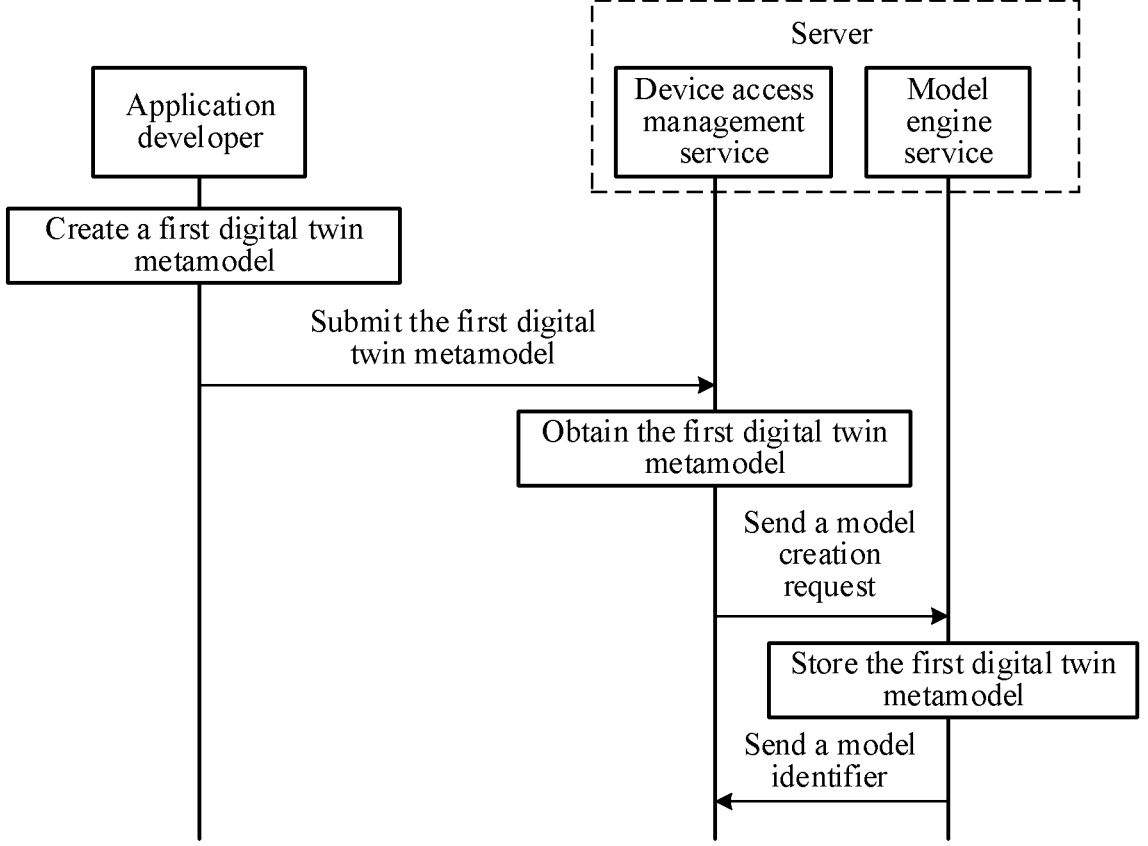
FIG. 7 is a flowchart of steps of obtaining a digital twin model according to an embodiment of this disclosure.

In some embodiments, the application developer first registers with the IoT platform, the IoT platform generates a user identifier for the application developer, and then the application developer creates the first digital twin model corresponding to the first network device. A process in which the server obtains the first digital twin model is shown in FIG. 7. The IoT platform provides a digital twin model creation page. The application developer can compile, on the digital twin model creation page, model code of each digital twin metamodel in the first digital twin model based on the data format supported by the first network device, find a standard model of the upper device type of the first network device by using the standard model service of the IoT platform, and associate the created first digital twin model with the corresponding standard model of the upper device type, in other words, associate the created first digital twin metamodel group with a corresponding standard metamodel group. After the model code is compiled, the application developer can submit the model code on the digital twin model creation page.

For example, the foregoing process of associating the first digital twin model with the corresponding standard model is described. When compiling the model code of each digital twin metamodel in the first digital twin model, the application developer adds an element of "@type" to the code of each digital twin metamodel in the created first digital twin model, and adds, after the element of "@type", a metamodel identifier of a standard metamodel in a standard model corresponding to each digital twin metamodel. Therefore, each digital twin metamodel in the created first digital twin model can be associated with the corresponding standard metamodel in the corresponding standard model by using the element of "@type", the element of "@type" is added in code corresponding to each parameter of each digital twin metamodel, and an identifier of a corresponding parameter in a standard metamodel corresponding to each parameter in each digital twin metamodel is added after the element of "@type", to associate each parameter in each digital twin metamodel with the corresponding parameter in the corresponding standard metamodel by using the element of "@type". Each digital twin metamodel of the first digital twin model is associated with each standard metamodel of the corresponding standard model, and each parameter of each digital twin metamodel is associated with each parameter of each corresponding standard metamodel, so that the first digital twin model is associated with the corresponding standard model.

The first digital twin model provides the data format supported by the first network device, and the standard model provides the standard data format. Therefore, the first digital twin model records, by using the element of "@type", a first correspondence between the standard data format and the data format supported by the first network device, and the first correspondence includes a correspondence between a digital twin metamodel of the first digital twin model and a standard metamodel of the standard model, so that a model engine service can implement, by parsing an element of "@type" of each digital twin metamodel in the first digital twin model, conversion between the data format supported by the first network device and the standard data format.

In some embodiments, in response to a submission operation performed on the model code on the digital twin model creation page, a device access service sends a model creation request to the model engine service, where the model creation request carries the model code of the first digital twin model, the model creation request indicates to store the created first digital twin model, and the model engine service stores the first digital twin model, obtains a model identifier of the first digital twin model by parsing an id field in the first digital twin model, and identifies, by parsing the element of "@type" of each digital twin metamodel in the first digital twin model, a standard metamodel associated with the digital twin metamodel.

It should be noted that the model identifier of the first digital twin model is obtained based on a model number of the first network device. In some embodiments, before creating the first digital twin model of the first network device, the application developer obtains the model number of the first network device from a manufacturer of the first network device. In some cases, the model number of the first network device may be a character string. Optionally, when creating the first digital twin model, the application developer compiles the id field in the model code by using a target field in the model number of the first network device, to create the model identifier of the first digital twin model. Alternatively, when submitting the model code on the digital twin model creation page, the application developer simultaneously submits the model number of the first network device, and in response to a submission operation performed on the model code and the model of the first network device on the digital twin model creation page, the device access service, uses the target field in the model number of the first network device as the model identifier of the first digital twin model, and generates the id field in the model code based on the model identifier.

For example, creating a digital twin model of a camera with an A01 model number is used as an example for description. It should be understood that A01 is merely an abbreviation for a model number of the camera, and the model number of the camera is a character string. The application developer obtains the model number character string of the camera with the A01 model number, uses a target field in the character string as a model identifier, and compiles model code of the digital twin model of the camera with the A01 model number on the digital twin model creation page based on a data format supported by the camera with the A01 model number. The digital twin model includes two digital twin metamodels: a command metamodel commandA01 and a property metamodel propertyA01. Through the element of "@type", commandA01 is associated with a standard metamodel rotateCommand, and propertyA01 is associated with a standard metamodel status. The model code of the camera with the A01 model number is as follows:

```
{
    "id":"dtml:dahua:Camera;1", //model identifier
    "properties":{   //property metamodel
        "propertyA01":{
            "@type":"status"   //associated with the standard metamodel
identified by status
        }
    },
    "command":{   // command metamodel
        "commandA01":{
            "@type":"rotateCommand", //associated with the standard
metamodel identified by rotateCommand
            "displayName":"camera rotation",
            "input":{
                "@type": "object",
                "displayName":"parameters: horizontal rotation angle,
vertical rotation angle, and speed",
                "fields":{
                    "ha": {   //horizontal rotation angle parameter
                        "@type":"integer, horizontalAngle "
//associated with horizontalAngle
                    },
                    "va": {   //vertical rotation angle parameter
                        "@type":"integer, verticalAngle "// associated
with verticalAngle
                    },
                    "speed": {   //speed parameter
                        "@type":"integer, speed "// associated with speed
```

-continued

```
                    }
                  }
                }
              }
            }
          }
```

A digital twin metamodel identified by commandA01 is a command metamodel, and is configured to provide a data format supported by a rotate command of the camera with the A01 model number. The rotate command includes three input parameters: the horizontal rotation angle, the vertical rotation angle, and the speed. For the three parameters, the data formats supported by the camera with the A01 model number are respectively formats described by code segments corresponding to ha, va, and speed. A digital twin metamodel identified by propertyA01 is a property metamodel, and is configured to provide a data format supported by status data of the camera with the A01 model number.

Figure 8:
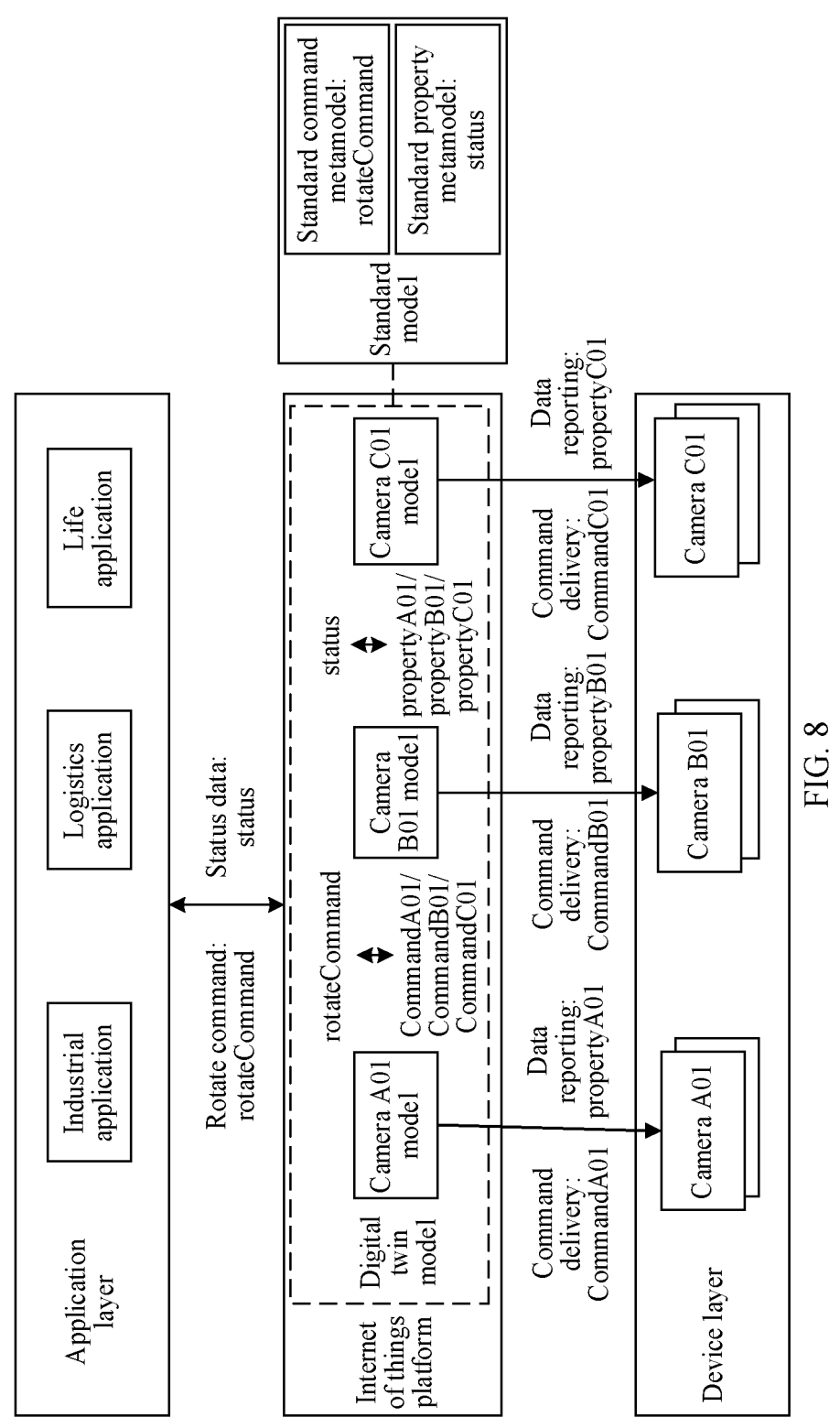
FIG. 8 is a schematic diagram of a device control method according to an embodiment of this disclosure.

It should be noted that data formats supported by network devices with different model numbers of a same upper device type are different. Therefore, different digital twin models need to be created based on the data formats supported by the network devices with different model numbers, and the digital twin models of the network devices with different model numbers are associated with a standard model of the upper device type. For example, an example in which the upper device type is a camera is used for description. As shown in FIG. 8, for a camera with an A01 model number, a camera with a B01 model number, and a camera with a C01 model number, digital twin models corresponding to the cameras with the three model numbers may be separately created, and the digital twin models corresponding to the cameras with the three model numbers are separately associated with a camera standard model.

Digital twin models of network devices with a plurality of model numbers are associated with a standard model of the upper device type of the network device. When developing an IoT application for the network device, the application developer can enable the network device to identify a control entity of a control command sent by a control device without adapting, one by one, data formats supported by the network devices with different model numbers, so that a process of controlling the network device is simplified.

Step 403: The first network device sends a device access request to the server, where the device access request carries the model number of the first network device and a device identifier of the first network device.

The target field of the model number of the first network device is the model identifier of the first digital twin model corresponding to the first network device.

In some embodiments, after creating the first digital twin model of the first network device, the application developer notifies the manufacturer of the first network device of address information of the server. The manufacturer can preset the address information of the server in a configuration file of the first network device, and the model number and the device identifier of the first network device are further preset in the first network device. When the first network device is started for the first time and accesses a network, the first network device can send the device access request to the server based on the address information of the server, where the device access request carries the model number and the device identifier of the first network device.

Step 404: The server receives the device access request of the first network device, and associates the first network device with the corresponding first digital twin model.

In some embodiments, the step 404 includes the following two processes:

Process 1: Associate the first network device with the corresponding first digital twin model.

In some embodiments, in response to the device access request of the first network device, a device access management service obtains the target field in the model number of the first network device carried in the device access request, determines a model identifier that is the same as the target field, where a digital twin model corresponding to the model identifier is the first digital twin model corresponding to the first network device, correspondingly stores the device identifier of the first network device and the model identifier, to establish a third correspondence between the device identifier of the first network device and the first digital twin model, and sends the model identifier to the model engine service.

Process 2: Create a running instance of the first network device.

In some embodiments, the model engine service creates the running instance of the first network device based on the first digital twin model corresponding to the model identifier, and generates an instance identifier corresponding to the running instance. The running instance is used to store status data of the first network device. The model engine service sends the instance identifier of the first network device to the device access management service, and the device access management service stores information about a correspondence between the instance identifier, the model identifier, and the device identifier of the first network device, to associate the first network device with the corresponding first digital twin model and the corresponding running instance.

Step 405: The control device sends a first control command of the first network device to the server, where the first control command carries the device identifier of the first network device and a first control entity, the first control command instructs the first network device to perform an operation corresponding to the first control entity, and the first control entity is a standard data format.

In some embodiments, the control device sends the first control command using the IoT application. The IoT application is an application program developed by the application developer based on the standard application programming interface, and the first control command carries the device identifier of the first network device and the first control entity in the standard format. Optionally, the IoT application provides a control page. A user of the IoT application can subscribe to the first network device on the control page, and send the first control command of the first network device to the server.

Figure 9:
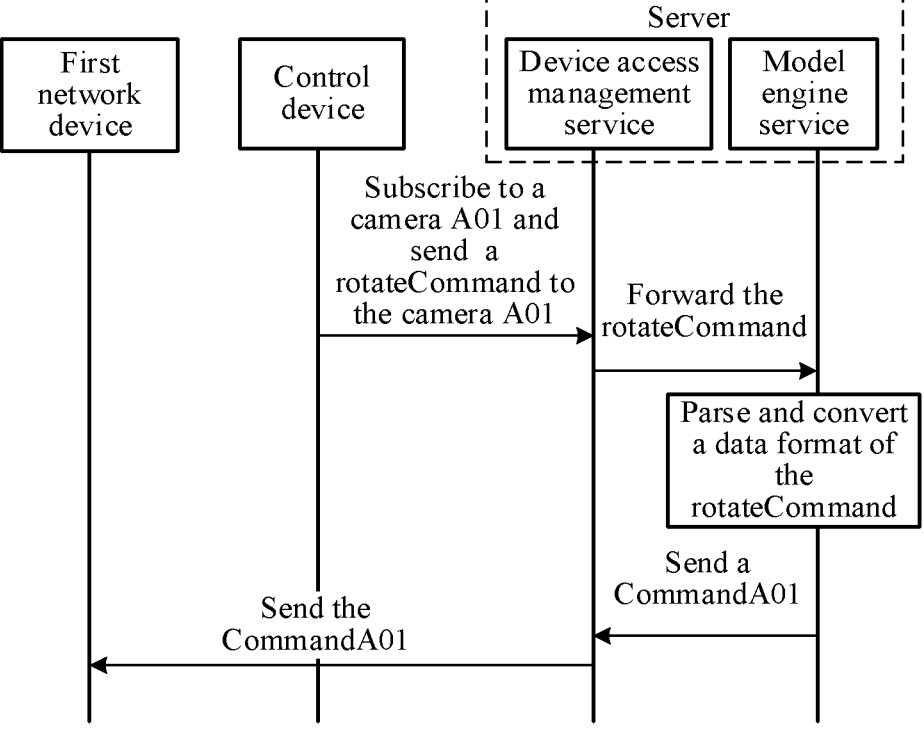
FIG. 9 is a flowchart of steps of sending a control command according to an embodiment of this disclosure.

For example, as shown in FIG. 9, an example in which the control device sends a rotate command for a camera with an A01 model number to the server is used for description. The control device displays the control page of the IoT application, displays, on the control page, a plurality of network devices that have accessed the IoT platform, displays a parameter input page of the rotate command of the camera with the A01 model number in response to a click operation on the camera with the A01 model number, generates a control entity of the rotate command for the server based on a command parameter in the parameter input page in response to a submission operation on the parameter input page, and sends a rotateCommand to the server, where the rotateCommand carries a device identifier of the camera with the A01 model number and the control entity of the rotate command.

In some embodiments, the device access management service receives the first control command of the control device, where the first control command instructs the first network device to perform the operation corresponding to the first control entity. For example, the device access management service receives a rotate command of the control device. The rotate command carries a device identifier and a control entity, and the control entity in the rotate command indicates a camera corresponding to the device identifier to rotate by a target angle at a target speed.

Step 406: The server receives the first control command of the control device, and determines, based on the device identifier of the first network device, the first digital twin model corresponding to the first network device, where the first digital twin model records the first correspondence between the standard data format and the data format supported by the first network device.

The first digital twin model records, by using the element of "@type", the first correspondence between the standard data format and the data format supported by the first network device.

In some embodiments, in response to receiving the first control command of the control device, the device access management service determines, based on a correspondence between the device identifier and the model identifier stored in the foregoing step 404, a digital twin model indicated by the model identifier corresponding to the device identifier of the first network device as the first digital twin model corresponding to the first network device, and forwards the first control command and the model identifier of the first digital twin model to the model engine service.

Step 407: The server converts, based on the first correspondence, the first control entity into the data format supported by the first network device, and sends a converted first control entity to the first network device.

The first correspondence includes a correspondence between a digital twin metamodel of the first digital twin model and a standard metamodel of a standard model. The standard model may be a standard metamodel group, and the standard model may include one or more standard metamodels. Correspondingly, the server determines one or more standard metamodels of the upper device type of the first network device based on the correspondence between a digital twin metamodel of the first digital twin model and a standard metamodel of a standard model, converts, based on the first digital twin model and the one or more standard metamodels of the upper device type, the first control entity into the data format supported by the first network device, and sends a converted first control entity to the first network device.

In some embodiments, the model engine service parses the first digital twin model, determines a standard command metamodel corresponding to a metamodel identifier corresponding to the element of "@type" of a command metamodel in the first digital twin model, and determines the standard command metamodel as a standard metamodel corresponding to the upper device type of the first network device. The model engine service converts, based on a data format described by the command metamodel in the first digital twin model, a standard data format described by the standard command metamodel, and a correspondence between each parameter in the command metamodel and each parameter in the standard command metamodel, the first control entity from the standard data format to the data format supported by the first network device, and sends a converted first control instruction to the device access management service, where the converted first control instruction carries a converted first control entity and the device identifier of the first network device. The device access management service sends the converted first control entity to the first network device based on the device identifier, or sends the converted first control instruction to the first network device.

For example, as shown in FIG. 9, an example in which a rotate command is sent to a camera with an A01 model number is used for description. The model engine service receives a rotateCommand, performs format conversion on three parameters in a control entity of the rotateCommand based on a correspondence between each parameter in a command metamodel of a digital twin model corresponding to the camera with the A01 model number and each parameter in a corresponding standard command metamodel, converts a format of horizontalAngle into a format of ha, converts a format of verticalAngle into a format of va, and converts a format of speed into a format of speed, to obtain a control entity of a commandA01, obtain a control entity of a data format supported by the camera with the A01 model number. The control entity of the commandA01 and a device identifier of the camera with the A01 model number are sent to the device access management service, where the device access management service sends the control entity of the commandA01 to the camera with the A01 model number.

Step 408: The first network device sends the status data and the device identifier of the first network device to the control device by using the server, where the status data is the data format supported by the first network device.

The status data indicates a status of the first network device. For example, if the first network device is a camera, the status data indicates a rotation angle, a remaining power, a temperature, and the like of the camera.

In some embodiments, the first network device sends the status data of the first network device to the control device by using the server, where the status data is the data format supported by the first network device. For example, the first network device is a camera with any model number. As shown in FIG. 8, data formats of status data sent by cameras with different model numbers are different. Status data sent by the camera with the A01 model number is property A01, status data sent by the camera with the B01 model number is propertyB01, and status data sent by the camera with the C01 model number is propertyC01.

Step 409: The server receives the device identifier and the status data of the first network device, and determines, based on the device identifier of the first network device, the first digital twin model corresponding to the first network device.

In some embodiments, in response to receiving the device identifier and the status data of the first network device, the device access management service determines, based on a method similar to that in step 406, the first digital twin model corresponding to the first network device. Details are not described herein again.

Step 410: The server converts the status data into the standard data format based on the first correspondence, and sends converted status data to the control device.

In some embodiments, the model engine service converts, based on a method similar to that in step 407, the status data from the data format supported by the first network device into the standard data format, stores converted status data, and sends the converted status data to the device access management service. The device access management service sends the converted status data to the control device.

It should be noted that the server can be configured to perform format conversion on control commands of a plurality of network devices, to control the plurality of network devices. For network devices with a plurality of different model numbers of a same upper device type, the network devices with the plurality of different model numbers correspond to different digital twin models.

In some embodiments, the server can perform format conversion on a second control command based on a correspondence recorded in a second digital twin model of a second network device, to control the second network device. A model number of the second network device is different from the model number of the first network device, and an upper device type of the second network device is the same as the upper device type of the first network device. Correspondingly, this embodiment of this disclosure further includes the following. The server obtains the second digital twin model, and associates the second digital twin model with a corresponding standard model. A standard model corresponding to the second network device is the same as the standard model corresponding to the first network device, and the second digital twin model describes a data format supported by the second network device. The server receives the second control command of the control device, where the second control command carries a device identifier of the second network device and a second control entity, the second control command instructs the second network device to perform an operation corresponding to the second control entity, and the second control entity complies with a standard data format. The server determines, based on the device identifier of the second network device, a second digital twin model corresponding to the second network device, where the second digital twin model records a second correspondence between the standard data format and the data format supported by the second network device. The server converts, based on the second correspondence, the second control entity into the data format supported by the second network device, and sends a converted second control entity to the second network device. A implementation of the foregoing process is similar to step 402 to step 407. Details are not described herein again.

It should be noted that the foregoing embodiments are described by using an example in which a control command and status data are exchanged between a control device and a network device. In some embodiments, the method provided in this disclosure may only include that the control device sends the control command to the network device by using a server, or only include that the network device sends the status data to the control device by using the server.

According to the device control method provided in this embodiment of this disclosure, for network devices of any type, the network devices of the type include a plurality of different model numbers. Format conversion is performed, based on a correspondence that is recorded in a digital twin model of a network device with any model number of the type and that is between a standard data format of the network device of the type and a data format supported by the network device with the model number, on a control entity of a control command sent by a control device. According to the method, the control device can control the network devices with different model numbers by using a control entity of a control command in a unified standard data format, and the network device can identify the control entity of the control command sent by the control device without adapting the standard data format to data formats supported by the network devices with different model numbers. Decoupling between the network device and an IoT application is implemented, thereby simplifying a process of controlling the network device.

In the foregoing embodiments, when a digital twin model is created, "@type" indicates a correspondence between a digital twin metamodel in the digital twin model and a standard metamodel in a standard model. It may be understood that the foregoing correspondence may alternatively be indicated by using another preset identifier. This is not limited in this disclosure.

Figure 10:
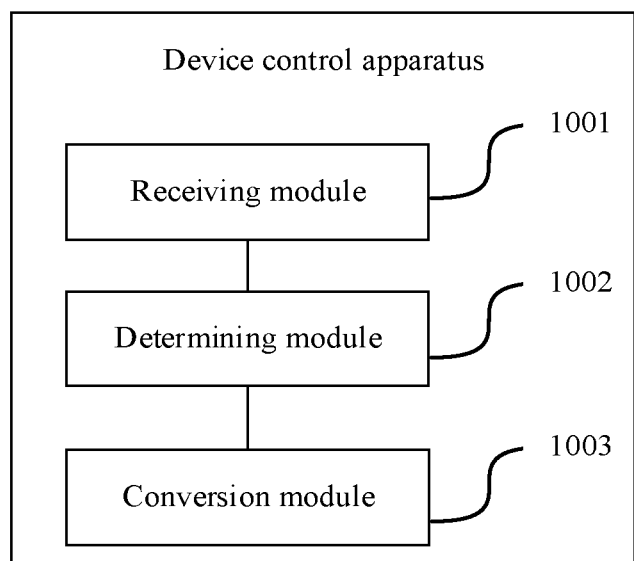
FIG. 10 is a schematic diagram of a structure of a device control apparatus according to an embodiment of this disclosure.

FIG. 10 is a schematic diagram of a structure of a device control apparatus according to an embodiment of this disclosure. The device control apparatus is configured to perform steps performed when the foregoing device control method is performed. Refer to FIG. 10. The device control apparatus includes a receiving module 1001, a determining module 1002, and a conversion module 1003.

The receiving module 1001 is configured to receive a first control command of a control device, where the first control command carries a device identifier of a first network device and a first control entity, the first control command instructs the first network device to perform an operation corresponding to the first control entity, the first control entity complies with a standard data format, and the standard data format is described by a standard model corresponding to an upper device type of the first network device.

The determining module 1002 is configured to determine, based on the device identifier of the first network device, a first digital twin model corresponding to the first network device, where the first digital twin model describes a data format supported by the first network device, and the first digital twin model records a first correspondence between the standard data format and the data format supported by the first network device.

The conversion module 1003 is configured to convert, based on the first correspondence, the first control entity into the data format supported by the first network device, and send a converted first control entity to the first network device.

In some embodiments, the receiving module 1001 is configured to receive a second control command of the control device, where the second control command carries a device identifier of a second network device and a second control entity, the second control command instructs the second network device to perform an operation corresponding to the second control entity, the second control entity complies with the standard data format, a model number of the first network device is different from a model number of the second network device, and the upper device type of the first network device is the same as an upper device type of the second network device.

The determining module 1002 is configured to determine, based on the device identifier of the second network device, a second digital twin model corresponding to the second network device, where the second digital twin model describes a data format supported by the second network device, and the second digital twin model records a second correspondence between the standard data format and the data format supported by the second network device.

The conversion module 1003 is configured to convert, based on the second correspondence, the second control entity into the data format supported by the second network device, and send a converted second control entity to the second network device.

In some embodiments, the receiving module 1001 is configured to receive status data of the first network device and the device identifier of the first network device, where the status data is the data format supported by the first network device.

The conversion module 1003 is configured to convert the status data into the standard data format based on the first correspondence, and send converted status data to the control device.

In some embodiments, the receiving module 1001 is configured to receive a device access request of the first network device, where the device access request carries the model number of the first network device and the device identifier of the first network device.

The determining module 1002 is configured to determine, based on the model number of the first network device, a first digital twin model corresponding to the model number of the first network device.

The apparatus further includes an establishing module configured to establish a third correspondence between the device identifier of the first network device and the first digital twin model.

In some embodiments, the first correspondence includes a correspondence between a digital twin metamodel of the first digital twin model and a standard metamodel of the standard model.

The conversion module 1003 is configured to determine one or more standard metamodels of the upper device type based on the correspondence between a digital twin metamodel of the first digital twin model and a standard metamodel of the standard model, and convert, based on the first digital twin model and the one or more standard metamodels of the upper device type, the first control entity into the data format supported by the first network device.

In some embodiments, the first digital twin model includes one or more digital twin metamodels. The digital twin metamodel includes one or more of the following: a property metamodel, a command metamodel, an event metamodel, a data metamodel, a component metamodel, and a relationship metamodel.

It should be noted that, when the device control apparatus provided in the embodiment corresponding to FIG. 10 performs device control, division of the foregoing functional modules is merely used as an example for description. During actual application, the foregoing functions may be allocated to different functional modules for implementation based on a requirement. In other words, an internal structure of the apparatus is divided into different functional modules to implement all or some of the functions described above. In addition, the device control apparatus provided in the foregoing embodiments and the device control method embodiments belong to a same concept. For a implementation process thereof, refer to the method embodiments. Details are not described herein again.

In this disclosure, the term "at least one" means one or more, and the term "a plurality of" means two or more. For example, a plurality of standard metamodels means two or more standard metamodels.

It should be further understood that the term "if" may be interpreted as "when" ("when" or "upon"), "in response to determining", or "in response to detecting". Similarly, based on the context, the phrase "if it is determined . . . " or "if [the stated condition or event] is detected" may be interpreted as "when . . . is determined", "in response to determining . . . " "when [the stated condition or event] is detected", or "in response to detecting [the stated condition or event]".

The foregoing descriptions are merely implementations of this disclosure, but are not intended to limit the protection scope of this disclosure. Various equivalent modifications or replacements readily figured out by any person skilled in the art within the technical scope disclosed in this disclosure shall fall within the protection scope of this disclosure. Therefore, the protection scope of this disclosure shall be subject to the protection scope of the claims.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, or improvement made without departing from the spirit and principle of this disclosure should fall within the protection scope of this disclosure.

What is claimed is:

1. A method implemented by a server, wherein the method comprises:

obtaining a standard model corresponding to a first upper device type of a first network device, wherein the standard model comprises standard metamodels or submodels;

receiving, from a control device, a first control command carrying a first device identifier of the first network device and carrying a first control entity, wherein the first control command instructs the first network device to perform a first operation corresponding to the first control entity, wherein the first control entity complies with a standard data format, and wherein the standard data format is described by the standard model;

determining, based on the first device identifier, a first digital twin model corresponding to the first network device, wherein the first digital twin model describes a first data format supported by the first network device and records a first correspondence between the standard data format and the first data format;

converting, based on the first correspondence, the first control entity into the first data format to obtain a converted first control entity; and sending, to the first network device, the converted first control entity.

2. The method of claim 1, further comprising:

receiving, from the control device, a second control command carrying a second device identifier of a second network device and carrying a second control entity, wherein the second control command instructs the second network device to perform a second operation corresponding to the second control entity, wherein the second control entity complies with the standard data format, wherein a first model number of the first network device is different from a second model number of the second network device, and wherein the first upper device type is the same as a second upper device type of the second network device;

determining, based on the second device identifier, a second digital twin model corresponding to the second network device, wherein the second digital twin model describes a second data format supported by the second network device and records a second correspondence between the standard data format and the second data format; and converting, based on the second correspondence, the second control entity into the second data format to obtain a converted second control entity; and sending, to the second network device, the converted second control entity.

3. The method of claim 1, further comprising:

receiving status data of the first network device and the first device identifier, wherein the status data is in the first data format;

converting, based on the first correspondence, the status data into the standard data format to obtain converted status data; and sending, to the control device, the converted status data.

4. The method of claim 1, wherein before receiving the first control command, the method further comprises:

receiving, from the first network device, a device access request carrying a model number of the first network device and carrying the first device identifier;

determining, based on the model number, the first digital twin model corresponding to the model number; and establishing a second correspondence between the first device identifier and the first digital twin model.

5. The method of claim 4, wherein converting the first control entity comprises:

determining, based on a third correspondence that is between a digital twin metamodel of the first digital twin model and a standard metamodel of the standard model and that is comprised in the first correspondence, one or more standard metamodels of the first upper device type; and converting, based on the first digital twin model and the one or more standard metamodels, the first control entity into the first data format.

6. The method of claim 1, wherein the first digital twin model comprises one or more digital twin metamodels, and wherein each of the one or more digital twin metamodels comprises one or more of a property metamodel, a command metamodel, an event metamodel, a data metamodel, a component metamodel, or a relationship metamodel.

7. A server comprising:

a memory configured to store instructions; and at least one processor coupled to the memory and configured to execute the instructions to cause the server to:

obtain a standard model corresponding to a first upper device type of a first network device, wherein the standard model comprises standard metamodels or submodels;

receive, from a control device, a first control command carrying a first device identifier of the first network device and carrying a first control entity, wherein the first control command instructs the first network device to perform a first operation corresponding to the first control entity, wherein the first control entity complies with a standard data format, and wherein the standard data format is described by the standard model;

determine, based on the first device identifier, a first digital twin model corresponding to the first network device, wherein the first digital twin model describes a first data format supported by the first network device and records a first correspondence between the standard data format and the first data format;

convert, based on the first correspondence, the first control entity into the first data format to obtain a converted first control entity; and send, to the first network device, the converted first control entity.

8. The server of claim 7, wherein the at least one processor is further configured to execute the instructions to cause the server to:

receive, from the control device, a second control command carrying a second device identifier of a second network device and carrying a second control entity, wherein the second control command instructs the second network device to perform a second operation corresponding to the second control entity, wherein the second control entity complies with the standard data format, wherein a first model number of the first network device is different from a second model number of the second network device, and wherein the first upper device type is the same as a second upper device type of the second network device;

determine, based on the second device identifier, a second digital twin model corresponding to the second network device, wherein the second digital twin model describes a second data format supported by the second network device and records a second correspondence between the standard data format and the second data format;

convert, based on the second correspondence, the second control entity into the second data format to obtain a converted second control entity; and send, to the second network device, the converted second control entity.

9. The server of claim 7, wherein the at least one processor is further configured to execute the instructions to cause the server to:

receive status data of the first network device and the first device identifier, wherein the status data is in the first data format; and convert, based on the first correspondence, the status data into the standard data format to obtain converted status data; and send, to the control device, the converted status data.

10. The server of claim 7, wherein the at least one processor is further configured to execute the instructions to cause the server to:

receive, from the first network device, a device access request carrying a model number of the first network device and carrying the first device identifier;

determine, based on the model number, the first digital twin model corresponding to the model number; and establish a second correspondence between the first device identifier and the first digital twin model.

11. The server of claim 10, wherein the at least one processor is further configured to execute the instructions to cause the server to:

determine, based on a third correspondence that is between a digital twin metamodel of the first digital twin model and a standard metamodel of the standard model and that is comprised in the first correspondence, one or more standard metamodels of the first upper device type; and convert, based on the first digital twin model and the one or more standard metamodels, the first control entity into the first data format.

12. The server of claim 7, wherein the first digital twin model comprises one or more digital twin metamodels, and wherein each of the one or more digital twin metamodels comprises one or more of a property metamodel, a command metamodel, an event metamodel, a data metamodel, a component metamodel, or a relationship metamodel.

13. A computer program product comprising computer-executable instructions that are stored on a non-transitory computer-readable medium and that, when executed by at least one processor, cause a server to:

obtain a standard model corresponding to a first upper device type of a first network device, wherein the standard model comprises standard metamodels or sub-models;

receive, from a control device, a first control command carrying a first device identifier of the first network device and carrying a first control entity, wherein the first control command instructs the first network device to perform a first operation corresponding to the first control entity, wherein the first control entity complies with a standard data format, and wherein the standard data format is described by the standard model;

determine, based on the first device identifier, a first digital twin model corresponding to the first network device, wherein the first digital twin model describes a first data format supported by the first network device and records a first correspondence between the standard data format and the first data format;

convert, based on the first correspondence, the first control entity into the first data format to obtain a converted first control entity; and send, to the first network device, the converted first control entity.

14. The computer program product of claim 13, wherein the computer-executable instructions, when executed by the at least one processor, further cause the server to:

receive, from the control device, a second control command carrying a second device identifier of a second network device and carrying a second control entity, wherein the second control command instructs the second network device to perform a second operation corresponding to the second control entity, wherein the second control entity complies with the standard data format, wherein a first model number of the first network device is different from a second model number of the second network device, and wherein the first upper device type is the same as a second upper device type of the second network device;

determine, based on the second device identifier, a second digital twin model corresponding to the second network device, wherein the second digital twin model describes a second data format supported by the second network device and records a second correspondence between the standard data format and the second data format;

convert, based on the second correspondence, the second control entity into the second data format to obtain a converted second control entity; and send, to the second network device, the converted second control entity.

15. The computer program product of claim 13, wherein the computer-executable instructions, when executed by the at least one processor, further cause the server to:

receive status data of the first network device and the first device identifier, wherein the status data is in the first data format; and convert, based on the first correspondence, the status data into the standard data format to obtain converted status data; and send, to the control device, the converted status data.

16. The computer program product of claim 13, wherein the computer-executable instructions, when executed by the at least one processor, further cause the server to:

receive, from the first network device, a device access request carrying a model number of the first network device and carrying the first device identifier;

determine, based on the model number, the first digital twin model corresponding to the model number; and establish a second correspondence between the first device identifier and the first digital twin model.

17. The computer program product of claim 16, wherein the computer-executable instructions, when executed by the at least one processor, further cause the server to:

determine, based on a third correspondence that is between a digital twin metamodel of the first digital twin model and a standard metamodel of the standard model and that is comprised in the first correspondence, one or more standard metamodels of the first upper device type; and convert, based on the first digital twin model and the one or more standard metamodels, the first control entity into the first data format.

18. The computer program product of claim 13, wherein the first digital twin model comprises one or more digital twin metamodels, and wherein each of the one or more digital twin metamodels comprises one or more of a property metamodel, a command metamodel, an event metamodel, a data metamodel, a component metamodel, or a relationship metamodel.

* * * * *